(12) United States Patent
Crocker et al.

(10) Patent No.: US 10,488,158 B1
(45) Date of Patent: Nov. 26, 2019

(54) INFRARED DETECTION SYSTEM

(75) Inventors: Thomas H. Crocker, Burlington, MA (US); Daniel O. Eyring, Acton, MA (US); Richard A. Beckerleg, Boxford, MA (US); Barry N. Levitt, Framingham, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 06/106,811

(22) Filed: Dec. 26, 1979

(51) Int. Cl.
*F41G 7/22* (2006.01)
*F41G 7/00* (2006.01)

(52) U.S. Cl.
CPC ........... *F41G 7/2293* (2013.01); *F41G 7/226* (2013.01); *F41G 7/2213* (2013.01); *F41G 7/2253* (2013.01)

(58) Field of Classification Search
CPC ...... F41G 7/2293; F41G 7/226; F41G 7/2253; F41G 7/2213
USPC ................ 244/3.15–3.17; 328/108, 111, 115
See application file for complete search history.

(56) References Cited

U.S. PATENT DOCUMENTS

| | | | | | |
|---|---|---|---|---|---|
| 2,434,937 A | * | 1/1948 | Labin et al. | ................... | 328/108 |
| 2,436,512 A | * | 2/1948 | Hollywood | ................... | 328/108 |
| 2,489,297 A | * | 11/1949 | Labin et al. | ................... | 328/108 |
| 2,903,204 A | * | 9/1959 | Nyman et al. | ............... | 244/3.16 |
| 3,064,924 A | * | 11/1962 | Fairbanks | .................... | 244/3.16 |
| 3,891,843 A | * | 6/1975 | Parkin | .................... | 244/3.16 |
| 3,931,515 A | * | 1/1976 | Parkin, II | ..................... | 244/3.16 |
| 3,944,167 A | * | 3/1976 | Figler et al. | ................. | 244/3.16 |
| 4,009,393 A | * | 2/1977 | Ashley, Jr. et al. | ......... | 244/3.16 |
| 4,037,806 A | * | 7/1977 | Hirsch | .................. | F41G 7/2293 244/3.16 |
| 4,174,177 A | * | 11/1979 | Gardner et al. | ............. | 244/3.16 |

FOREIGN PATENT DOCUMENTS

DE      2657261     *   7/1977     ................... 244/3.16

* cited by examiner

*Primary Examiner* — Bernarr E Gregory
(74) *Attorney, Agent, or Firm* — Raytheon Company

(57) ABSTRACT

An infrared signal processor is provided wherein infrared energy from objects on an area of the ground is directed towards a plurality of detectors disposed in a missile. The plurality of detectors scan the area of the ground and electrical signals produced by the detectors in response to the sensed infrared energy are processed to detect the presence of a ground target, typically a tank. Potential targets are detected, that is, are distinguished from ground clutter, by determining whether electrical pulses produced by the detectors in response to the sensed infrared energy have a proper pulse duration which is consistent with the width of a tank target. In particular, the electrical pulses are passed through a bandpass filter to filter signals produced by both ground clutter infrared energy and noise.

3 Claims, 5 Drawing Sheets

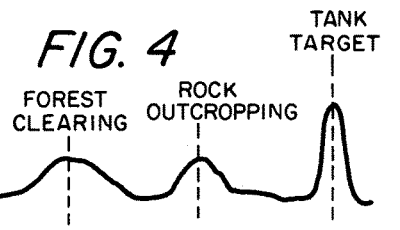
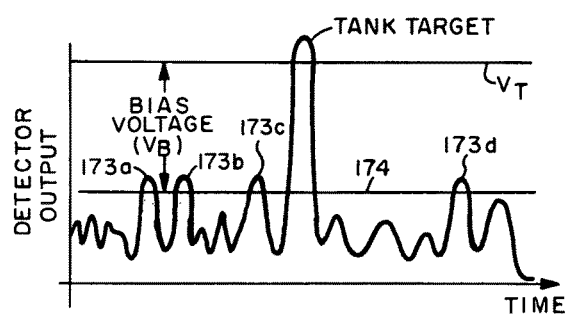
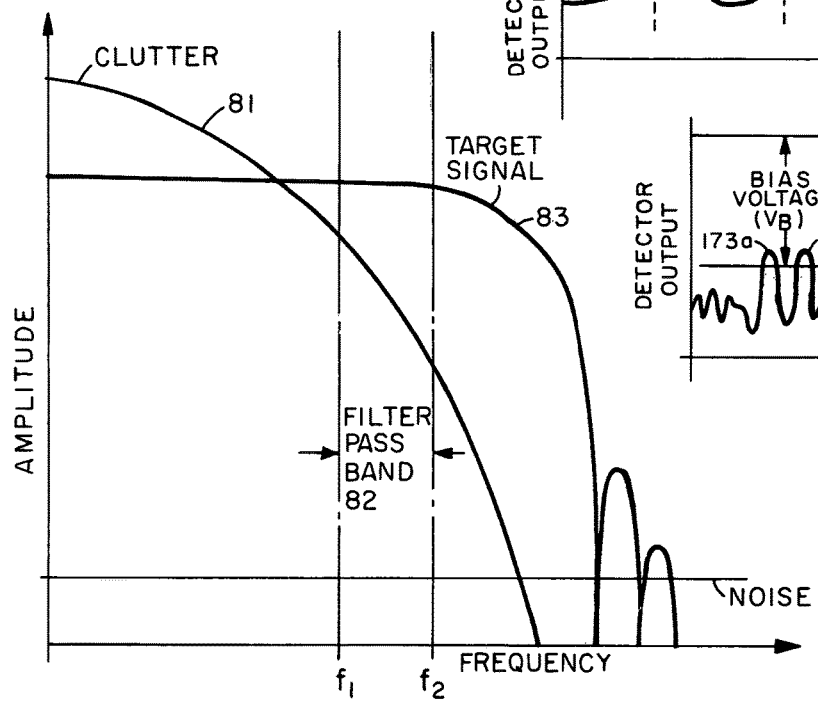
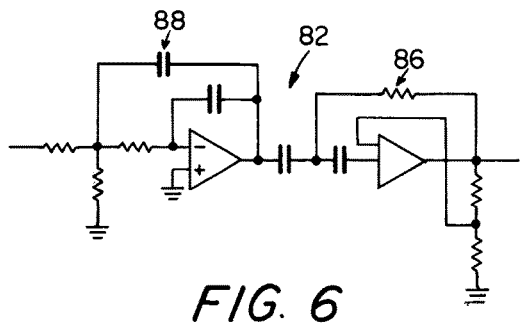
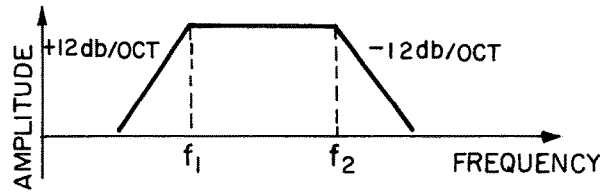

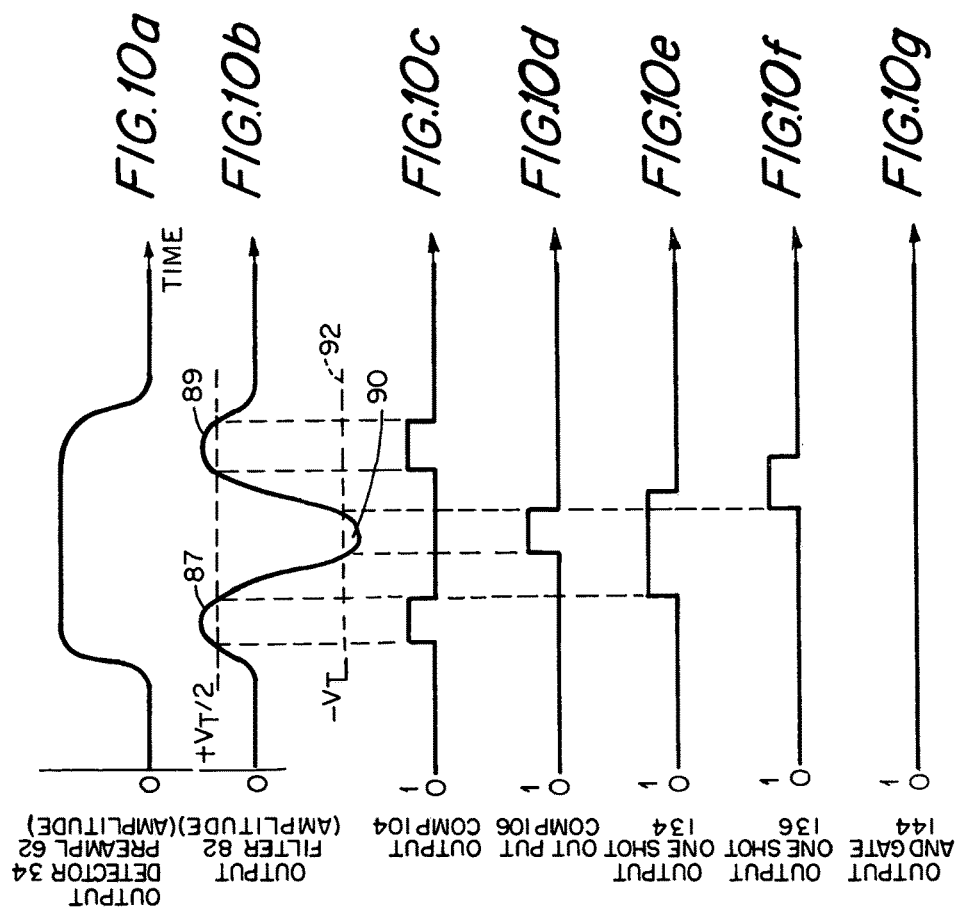
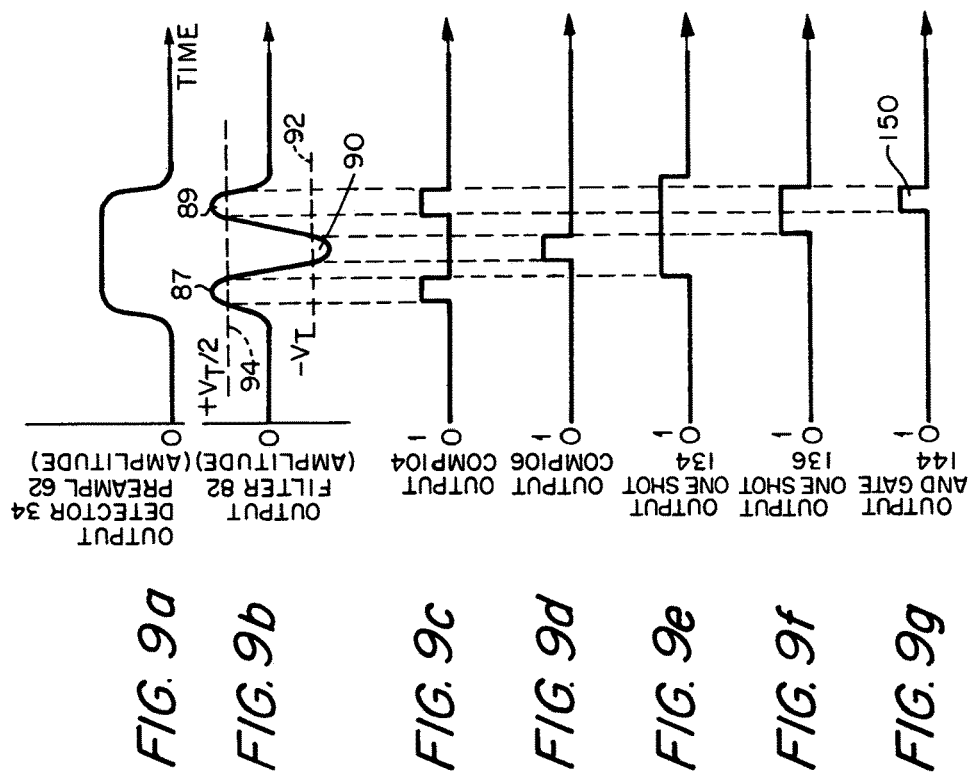

INFRARED DETECTION SYSTEM

BACKGROUND OF THE INVENTION

This invention relates generally to infrared detection systems and more particularly to infrared detection systems adapted for use in the discrimination of ground targets, such as tanks, from ground clutter.

As is known in the art, passive infrared guidance systems have been used in air-to-air missiles to provide guidance signals for such missiles to enable them home on the extremely hot exhaust of jet aircraft silhouetted against a cold blue sky. The small, sharply defined exhaust plume is easily discriminated from the more gently varying sky radiation by use of a fan-blade reticle modulating the energy focused on a single infrared detector, for example.

The air-to-surface environment is, however, not nearly so benign as this air-to-air environment. Here, cultural scene elements more nearly approximate target signatures, particularly tank target signatures, resulting in the need for more sophisticated implementations and discriminants in order to provide sufficient contrasts so that acquisition and tracking of such tank targets may be achieved in the relatively cluttered surface environment.

SUMMARY OF THE INVENTION

In accordance with the present invention, an infrared signal processor is provided wherein infrared energy from objects on an area of the ground is directed towards a plurality of detectors disposed in a missile. The plurality of detectors scan the area of the ground and electrical signals produced by the detectors in response to the sensed infrared energy are processed to detect the presence of a ground target, typically a tank. Potential targets are detected, that is, are distinguished from ground clutter, by determining whether electrical pulses produced by the detectors in response to the sensed infrared energy have a proper pulse duration which is consistent with the width of a tank target. In particular, the electrical pulses are passed through a bandpass filter to reduce the amplitude of signals produced by both ground clutter infrared energy and noise. The signals passed by the bandpass filter are fed to pulsewidth detection circuitry which is also fed by a threshold voltage. A constant false alarm rate circuit produces a voltage level representative of the infrared intensity of a preselected number of ground clutter produced signals per scan cycle having proper widths and lengths to be potential tank targets. The voltage level is then biased to a higher level by a bias voltage representative of the difference in the infrared energy intensity expected between clutter and tank targets. This voltage level provides the threshold voltage and enables the pulse width detection circuit to reject signals having insufficient infrared intensity level to be from tank targets.

BRIEF DESCRIPTION OF THE DRAWINGS

The foregoing features of this invention, as well as the invention itself, may be more fully understood from the following detailed description read together with the accompanying drawings, in which:

FIG. 4 is a time history of a signal produced by a detector of the scanning system in FIG. 2 as such system scans objects on the ground;

FIG. 6 is a schematic diagram of a bandpass filter used in the processor shown in FIG. 5;

FIG. 7 is a diagram showing the frequency response of the bandpass filter shown in FIG. 6;

FIG. 8 is a diagram showing the frequency spectrum of clutter, a target signal, and noise;

FIGS. 9a-9g are timing diagrams useful in understanding the operation of the processor shown in FIG. 5 when the scanned object has a proper size to be from a target;

FIGS. 10a-10g are timing diagrams useful in understanding the operation of the processor shown in FIG. 5 when the scanned object has a size larger than the size of a target;

FIG. 11 is a diagram of the time history of the signal produced by a detector of the scanning system, such diagram being useful in understanding the operation of the processor shown in FIG. 5.

DESCRIPTION OF THE PREFERRED EMBODIMENT

Figure 1:
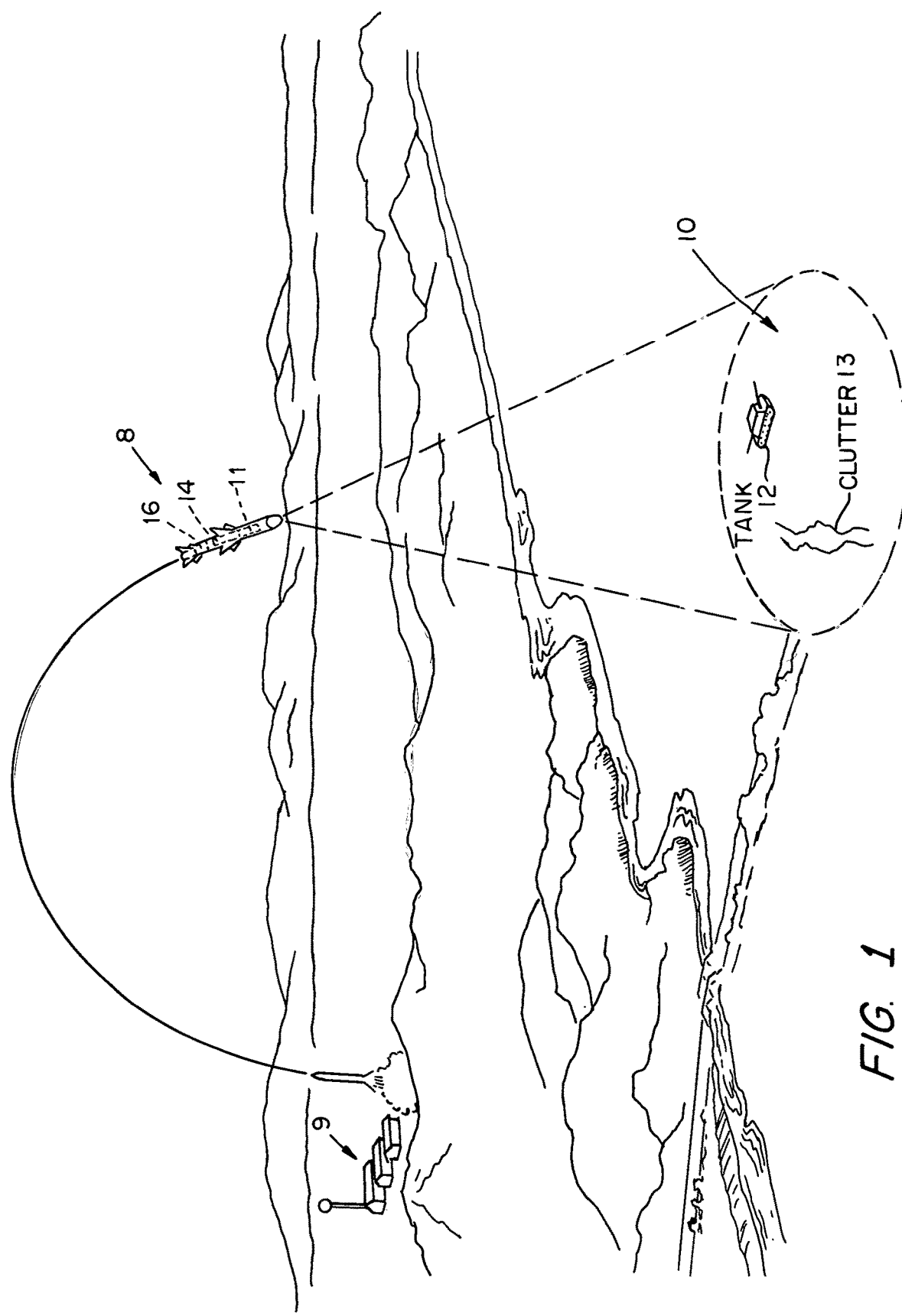
FIG. 1 shows a missile containing a processor according to the invention launched from a ground station and guided towards a ground target.

Referring now to FIG. 1 a guided missile 8 is shown launched from a ground station 9 and directed towards an area 10 remote from a ground station 9. As the missile 8 makes its downward, here, substantially vertical, trajectory towards the area 10 an infrared scanning system 11 carried by the missile 8 in its frontal portion continually scans the area 10 for a ground target, here a tank 12. Signals produced by the scanning system 11 are fed to a processor 14 to detect the presence of a tank in the scanned area 10 in a manner to be described. Once detected, a guidance system 16 maintains track of such tank 12 by processing signals produced by the scanning system 11 in a conventional manner. Sufficient to say here that infrared scanning system 11 carried within the frontal portion of missile 8 responds to both infrared energy radiated from a target to be destroyed by the missile 8, here a tank 12, and energy radiated from ground clutter 13 in the area of the ground being scanned. Ground clutter includes both natural occurring backgrounds such as forests, grasslands, marsh, deserts, gravel, soil and sky and man-made arrangements of natural objects such as stone walls. During a search or acquisition mode, which commences when the missile 8 is a predetermined altitude above the ground target area 10, the processor 14 is provided to detect the presence of a tank in the area 10 being scanned, in a manner to be described, and once such a tank is detected, the guidance system 16 disposed in the missile is placed in a track mode to properly gimbal the infrared scanning system 11 in the missile in a conventional manner by a positioning system (not shown) so as to maintain the boresight axis of the scanning system 11 directed towards the detected tank. Such orientation is maintained through a measurement of the angular deviation of an image of the infrared energy radiated by the tank and detected by the infrared scanning system 11 from the azimuthal axis and elevation axis of the scanning system determined in a manner to be described. The rate of the angular deviation measurement during the track mode also provides information to the guidance system 16 of the missile 8, such guidance system thereby generating appropriate maneuvers in a conventional manner to cause the missile 8 to intercept the tank 12.

Figure 2:
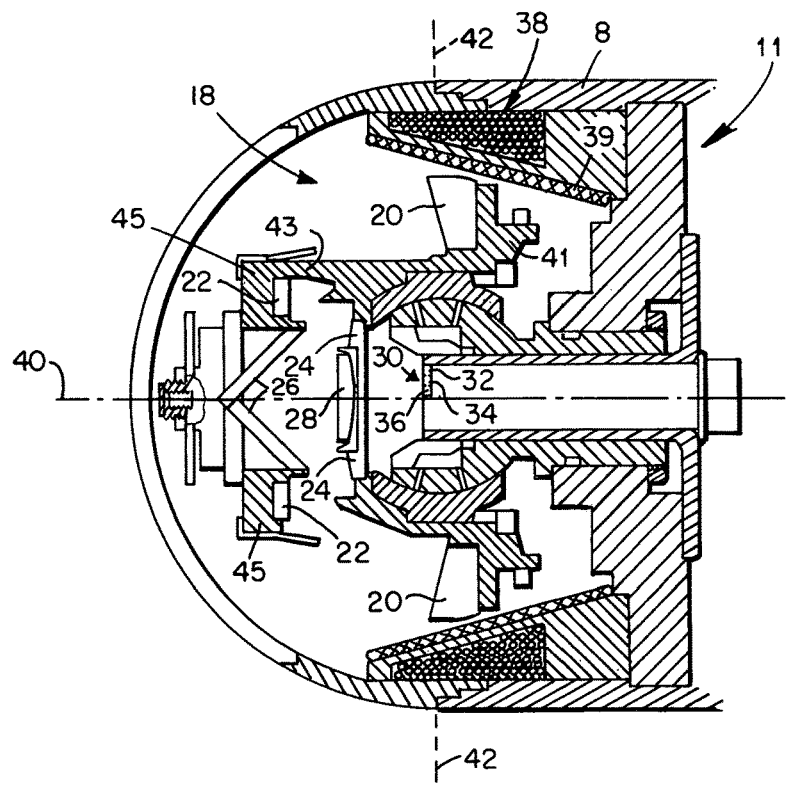
FIG. 2 is a cross-sectional diagram of an infrared scanning system carried in the missile shown in FIG. 1.

Referring now to FIG. 2 the infrared scanning system 11 is here shown to include: an optical system 18 comprising a primary mirror 20; a secondary mirror 22; a tertiary mirror 24, a Porro-prism 26 (here a pair of mirrors disposed to form a right angle), and collector lens 28, for focussing infrared energy radiated from the area 10 of the ground being scanned (FIG. 1) onto an array of infrared detectors 32, 34, 36 disposed in an array plane; and a scanning mechanism 38, here an electric motor which has a stator section 39 fixed to the body of missile 8 and a rotor section 41 mounted to the primary mirror 20 similar to that shown in U.S. Pat. No. 3,872,308 issued Mar. 18, 1975 and assigned to the same assignee as the present invention for producing a relative motion between the Porro-prism 26 (which is mechanically connected to rotor 41 through a spider arm 43, mirror 22, and support brackets 45, 47) and the array 30 of infrared detectors 32, 34, 36, which are stationary with respect to the body of missile 8. In particular, the scanning mechanism 38 rotates the Porro-prism 26 about a rotational axis 40 perpendicular to the line of intersection of the planes of the pair of reflecting surfaces of the Porro-prism 26 so that each point of the infrared energy radiated from the area 10 (FIG. 1) of the ground being scanned is focussed at the image plane and is rotated at a predetermined angular rate about such rotational axis 40. Each one of the detectors 32, 34, 36 here has a predetermined field of view. Each one of the detectors 32, 34, 36 is responsive to the focussed infrared energy in its own field of view. The detectors 32, 34, 36 are disposed in the image plane along an axis orthogonal to the rotational axis 40, here along an axis corresponding to an elevation axis 42, as shown. The processor 14 (FIG. 1) is fed by the detectors 32, 34, 36 to detect the presence of a tank within the area 10 of the ground being scanned and, once such a target is detected, provides a track mode enable signal to the guidance system 16 (FIG. 1) in a manner to be described, to enable such guidance system 16 to provide proper gimbal signals to the scanning system 11 in a conventional manner to maintain the rotational axis 40 of the guidance system 11 directed toward the detected target and to enable such guidance system 16 to generate proper maneuvering signals for the missile 8 to cause such missile 8 to intercept such target.

Figure 3:
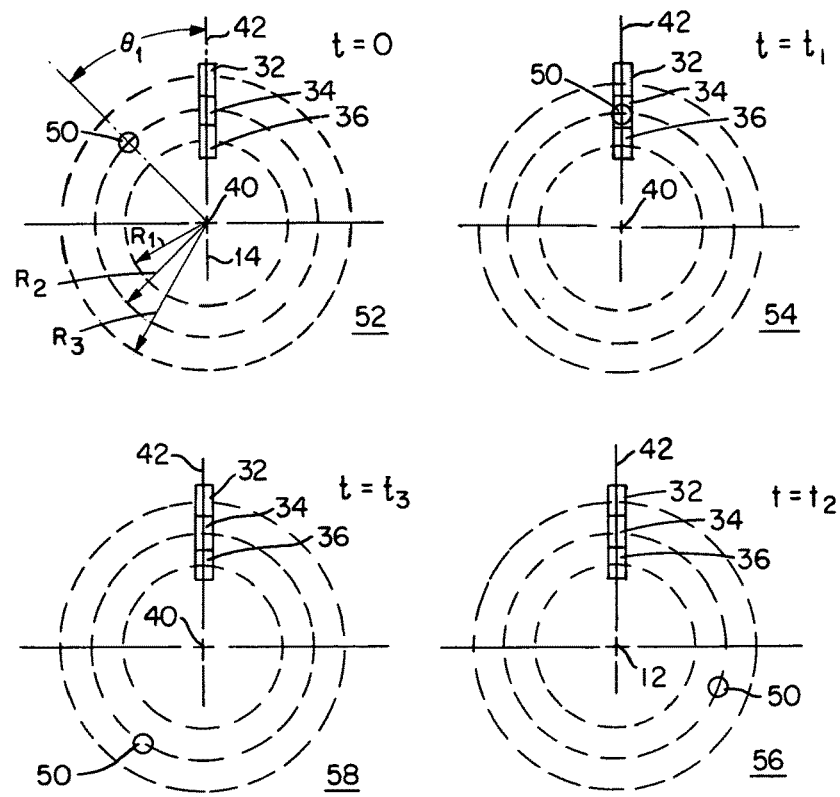
FIG. 3 is a set of four diagrams useful in understanding the operation of the scanning system shown in FIG. 2.

Referring now to FIG. 3, the operation of the infrared scanning system 11 will be described. FIG. 3 shows the image of an object, here represented as a circle 50 focussed in the image plane, here such object being in the area 10 (FIG. 1) of the ground being scanned by the scanning system 11. The effect of the scanning system 11 is to rotate each point of the object (i.e. here the circle 50) focussed at the image plane at a constant predetermined angular rate 2W (here shown clockwise) about the rotation axis 40 as illustrated by four sequential plan views 52, 54, 56, 58 respectively of the image plane. While it is understood that images from both clutter and tank objects will be focussed at the image plane, here we will consider the energy from only a single one of such objects, whether it be from clutter or a target, for purposes of understanding the scanning system 11. Thus, view 52 shows the imaged object 50 which might be from clutter or a tank, at a time t=0 seconds; that is at a time when the scanning system 11 is aligned with the reference, here azimuth axis 42 axis. This reference orientation is determined by a signal produced by a magnetic pickoff, not shown, included in the scanning system 11, such as, for example, that described in U.S. patent application Ser. No. 05/084,711 filed Nov. 28, 1970, inventor Robert Watkins, allowed Sep. 25, 1979, now U.S. Pat. No. 4,193,688, and assigned to the same assignee as the present invention. The centers of detectors 32, 34, 36 are displaced from the rotation axis 40 lengths $R_1$, $R_2$, $R_3$, respectively. It is noted that the radial deviation of the object 50 from the rotation axis 40 is here $R_2$, and the angular deviation from the reference, or azimuth axis 42, is here $\theta_1$. Views 54, 56 and 58 show the image object at subsequent times $t=t_1$, $t=t_2$ and $t=t_3$ respectively. A measurement of the radial deviation R of the object 50 from the rotation axis 40 may be made by determining the particular one of the detectors 32, 34, 36 that responds to the focussed infrared energy here detector 34, and the angular deviation $\theta_1$ of the object 50 from the reference axis 42 may be determined by determining the lapse of time between time t=0 seconds (i.e. the time when the scanning system 11 is aligned with the reference axis 42) and the time at which such detector response occurs, here time $t_1$. The angular deviation of the image 50 in polar coordinates $(R_2, \theta_1)$ are supplied to the guidance system 16 (FIG. 1) and the gimbal system during the track mode for elevation missile commands (i.e. proportional to $R_2 \sin \theta_1$) and for azimuth missile commands (i.e. proportional to $R_2 \cos \theta_1$), for example, as described in the U.S. patent application Ser. No. 05/084,711, filed Nov. 28, 1970, now U.S. Pat. No. 4,193,688. It is noted however, that before such commands are provided to the guidance system 16 (FIG. 1) and the gimbal system during the track mode, the processor 14 (FIG. 1) must detect the presence of a tank (as distinguished from clutter) in the area 10 (FIG. 1) of the ground being scanned. The period of time during which detection of such a tank is carried out is sometimes referred to as the acquisition, or "lock-on" mode.

Referring now to FIG. 4, the output of one of the detectors 32, 34, 36 (FIG. 2) during one scan cycle is shown for an exemplary case where the area 10 of the ground being scanned contains a forest clearing, a rock outcropping, and a tank target. It is noted that a tank target may be distinguished from clutter, here the forest clearing and the rock outcropping, by the fact that the portions of this signal produced by the detector as a result of the clutter are generally longer in time duration than the portions of such detector output signal which produced by the tank and, secondly, that the amplitude of the signal produced as a result of the target is greater than the amplitude produced as a result of the clutter. It is also noted that because each one of the detectors 32, 34, 36 (FIG. 2) has a fixed, predetermined field of view, and since the dimensions of the tank are known, to within an approximation, the maximum pulsewidth of the signal produced by a detector in responding to infrared energy emanating from a tank is a known function of the range of the missile 8 to the tank (FIG. 1); here such range being the altitude of missile 8 from the ground to the area 10 of the ground being scanned where, as here, the missile 8 travels a substantially vertical trajectory to the ground area 10. Detection of a tank within the area 10 of the ground being scanned may be indicated, therefore, if the pulse produced by the detector has a width less than a predetermined maximum width related to the projected size of the tank energy focussed at the image plane for a predetermined range of altitudes of the missile 8 from the area 10 of this ground. As will be described, the processor 14 (FIG. 1) is enabled during the period of time the missile passes through this predetermined range of altitudes, and during this period of time (i.e. the acquisition phase), processor 14 responds to signals produced by the plurality of detectors 32, 34, 36 (FIG. 2) to detect the presence of a tank, and once such tank is detected, produces a track mode signal to enable the guidance system 16 (FIG. 1) and gimbal system to track such target and produce maneuvering signals for the missile 8 as described above.

Figure 5:
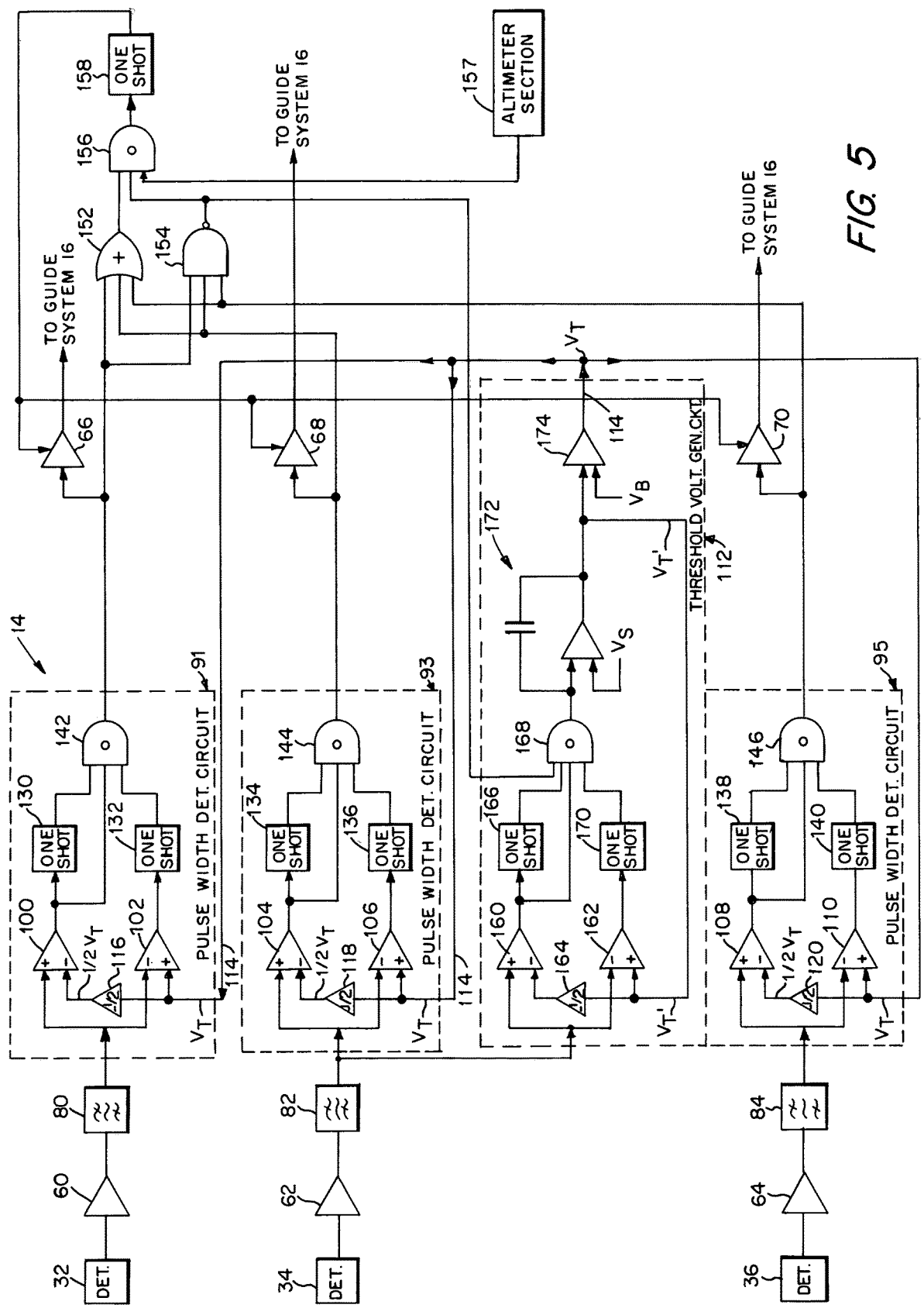
FIG. 5 is a block diagram of the processor used in the missile shown in FIG. 1.

Referring now also to FIG. 5, the processor 14 used to detect the presence of a tank in the area of the ground being scanned and to produce a track mode signal to enable the guidance system 16 (FIG. 1) and gimbal system to respond to signals from detectors 32, 34, 36 is shown coupled to the plurality of, here three infrared detectors 32, 34, 36, disposed in the image plane as shown in FIG. 2. In particular, detector 36 is disposed closest to the rotation axis 40 (as shown in FIG. 3); detector 32 is disposed furthest from the rotation axis 40; and detector 34 is disposed between detectors 32 and 36 as shown in FIG. 3. The outputs of the detectors 32, 34, 36 are fed to preamplifiers 60, 62, 64, as shown, here of any conventional design. The preamplifiers 60, 62, 64 are coupled to bandpass filters 80, 82, 84 respectively as shown. Each one of the bandpass filters 80, 82, 84 is identical in construction with an exemplary one thereof, here filter 82, being shown in detail in FIG. 6, the frequency response of such filter 82 being shown in FIG. 7. Such filter 82 includes a low pass, multiple feedback Butterworth filter 88 and a high pass filter 86 cascaded therewith. The filter 82 has a bandpass of $f_1$ to $f_2$, as shown. As shown in FIG. 7, the high pass filter portion has a+12 db per octave slope and provides a double differentiation of the pulses fed to it by detector 34 and preamplifier 62. As noted above, the clutter signal generally has the characteristic that it is extended in length compared to a tank produced signal and thereby causes the detector 34 and amplifier 62 responding to such clutter produced signal to produce an output signal or pulse which is extended in time, as discussed in connection with FIG. 4. Therefore, the frequency components of the extended clutter produced pulse will have predominately low frequency components (as shown by curve 81 in FIG. 8) and such low frequency components will be rejected by the high pass filter portion of the bandpass filter 82. Pulses produced by the detector 34 and preamplifier 62 responding to infrared energy from a tank on the other hand will be shorter in time duration than pulses produced in response to clutter infrared energy (as discussed in connection with FIG. 4) and hence a substantial portion of the frequency components associated with such shorter, tank produced pulses, will extend beyond the predominant frequency components associated with clutter produced pulses as shown by curve 83 (FIG. 8). That is, the frequency bandwidth of the shorter tank produced pulses will be greater than, and extend beyond, the frequency bandwidth of the clutter produced pulses. Therefore, while the lower frequency portion of the tank produced pulses is rejected by the high pass filter portion of the bandpass filter 82 (i.e. components having a frequency less than $f_1$) the higher frequency portions of such tank produced signal pass through the filter 82. System noise on the other hand has frequency components which are substantially uniform over its frequency spectrum and high frequency components of such noise (i.e. components having frequencies greater than $f_2$) are rejected by the low pass filter portion of the bandpass filter 82 and low frequency components are rejected by the highpass filter portion of the bandpass filter 82. The effect of bandpass filter 82 on the time history of a pulse produced by detector 34 and preamplifier 62 in response to an object, whether from clutter or a tank, as shown in FIG. 9a, is shown by the output pulse produced by the bandpass filter 82 in FIG. 9b. It is noted that the effect of the bandpass filter 82 is to transform the waveform of the pulse produced by the detector 34 and preamplifier 62 into a "double-humped" pulse as shown in FIG. 9b; one of the pair of humps, i.e. pulse 87, being produced in response to the leading edge of the pulse produced by the detector 34 and preamplifier 62 and the other hump, i.e. pulse 89, being produced in response to the trailing edge. A pulse 90 is produced, except for extremely wide clutter, of opposite sense from pulses 87, 89 and is produced at substantially the center of the pulses produced by detector 34 and preamplifier 62. It is noted that the amplitude of the pulses 87, 89 is approximately half the amplitude of center pulse 90 so that the entire pulse has an average value of zero.

The outputs of filters 80, 82 and 84 (FIG. 5) are fed to pulsewidth determining circuits 91, 93, 95, respectively, as shown. The pulsewidth determining circuits 91, 93, 95 include three pairs of comparators 100, 102; 104, 106; 108, 110, respectively as indicated in FIG. 5. It is noted that the output of the bandpass filter 82 is coupled to the middle one of the detectors, i.e. detector 34, and is also fed to a threshold voltage generator circuit 112, the details of which will be described. Sufficient to say here, however, the threshold voltage generator circuit 112 includes a constant false alarm rate circuit which produces a voltage having a level representative of the infrared intensity of a preselected number of ground clutter produced signals per scan cycle having proper widths and lengths to be potential tank targets. The voltage level is then biased to a larger level by a bias voltage representative of the difference in intensity between infrared energy produced by ground clutter objects and tank targets. This biased voltage provides a threshold voltage $V_T$ on line 114 for the comparators 100-110 and rejects from further processing, signals having levels less than $V_T$, i.e. those objects which produce infrared energy having insufficient intensity to be from a tank target. The threshold voltage, $V_T$, produced by the threshold voltage generator circuit 112 is fed directly to comparators 102, 106 and 110, and is fed indirectly to comparators 100, 104 and 108, through amplifiers 116, 118 and 120, respectively, as shown. Here each one of the amplifiers 116, 118 and 120 has a gain of minus one-half to produce an output voltage of $-V_T/2$. A typical relationship between a pulse produced by one of the detectors, here detector 34, in response to detection of an object which produces sufficiently strong infrared energy to be from a tank target, is shown in FIG. 9a; the "double humped" filtered pulse produced by bandpass filter 82, is shown in 9b; and the voltages $V_T$ and $-V_T/2$ fed to the comparators 100, 102 by the threshold voltage generator circuit 112 and shown in FIG. 9b by dotted lines 92 and 94 respectively. The comparators 102, 106 and 110 produce a high, or logical 1 signal, when the levels of the pulses fed to them by band pass filters 80, 82 and 84, respectively are greater than the threshold voltage $V_T$ and produce a low or logical 0 signal when the levels of such pulses are less than $V_T$, respectively. The comparators 100, 104 and 108 produce a high, or logical 1, signal when the levels of the pulses fed to them from the bandpass filters 80, 82 and 84, respectively are greater than the $-V_T/2$ and produce a low or logical 0 signal when the levels of such pulses are less than $-V_T/2$, respectively. Thus, considering the pulse shown in FIGS. 9a and 9b, which, as noted above may be from either a tank or clutter, the logical signals produced by comparators 104 and 106 are shown in FIGS. 9c and 9d, respectively.

The outputs of comparators 100, 102, 104, 106, and 108, 110 are fed to one shot multivibrators 130, 132, 134, 136 and 138, 140 respectively as indicated. Each one of the one shot multivibrators 130-140 are of any conventional design and each one produces a pulse having a predetermined width in response to the trailing edge of a pulse fed to it. The predetermined width or time duration of the pulse produced by each one of the one shot multivibrators 130, 134 and 138 is selected to be slightly longer than the maximum pulse width expected to be produced by a tank target as the energy emanating from such tank target is scanned through a detector. That is, if the maximum expected width of a tank is L and the minimum range (here the altitude of the missile as noted above) within the predetermined range of altitudes for which the acquisition phase is optimized is here A such width L will project as a focussed width L/A, here approximately the same as the instantaneous field of view of the detectors 32, 34, 36 at the image plane in which the detectors 32, 34, 36 are disposed. Since the scan rate is 2W the maximum time duration of a pulse produced by the detector responding to such tank will be (L/A) (1/R) (1/W) where R is the distance from the rotation axis 40 to the center of the detector. Therefore, the maximum time duration of a pulse produced by detectors 32, 34 in response to a tank will be (L/A) (1/$R_1$) (1/W) seconds; the maximum time duration of a pulse produced by detectors 34 in response to a tank will be (L/A) (1/$R_2$) (1/W) seconds; and the maximum time duration of a pulse produced by a tank by detectors 36 will be (L/A) (1/$R_3$) (1/W) seconds. The pulse produced by the one shot multivibrators 130, in response to the leading edge of pulses fed to them by bandpass filters 80, is therefore slightly longer than (L/A) (1/$R_3$) (1/W) seconds; the pulse produced by one shot multivibrator 134 in response to the leading edge of a pulse fed to it by bandpass filter 82 and comparator 104 is therefore slightly longer than (L/A) (1/$R_2$) (1/W) seconds; and the pulse produced by one shot multivibrator 138 in response to the leading edge of a pulse fed to it by bandpass filter 84 and comparator 108 is therefore slightly longer than (L/A) (1/$R_1$) (1/W) seconds.

The predetermined widths of the pulses produced by one shot multivibrators 132, 136 and 140 are selected to be half the time duration of the pulses produced by one shot multivibrators 130, 134 and 138. For the exemplary pulses shown in FIGS. 9a and 9b the outputs of one shot multivibrators 134, 136 are shown in FIGS. 9e and 9f, respectively. The outputs of comparators 100, 104 and 108 are fed to AND gates 142, 144 and 146 respectively together with the outputs of one shot multivibrators 130, 134 and 136, respectively, and the outputs of one shot multivibrators 132, 136, 140, as indicated. For the exemplary pulses shown in FIGS. 9a and 9b the output of an exemplary one of the AND gates 142, 144, 146, here AND gate 144, is shown in FIG. 9g to produce a pulse 150 indicating that the pulse width of the pulse produced by detector 34 and the preamplifier 62 had a time duration less than the maximum time duration expected from a tank target and a sufficient level to be from a tank target. For example, if the pulse produced by detector 34 and preamplifier 62 were in excess of this maximum expected time duration, as shown in FIG. 10a, the pulses produced by bandpass filter 82 would be as shown in FIG. 10b; the pulses produced by comparators 104 and 106 would be as shown in FIGS. 10c and 10d, respectively; and the pulses produced by one shot multivibrators 134 and 136 would be as shown in FIGS. 10e and 10f, respectively. It is noted that in such case the output of AND gate 144 would remain low, indicating that the width of the pulse produced by detector 34 has a time duration longer than that of the maximum time duration expected of a tank target. Further, if the level of the detector produced pulse is less than $V_{TH}$ such pulse would be rejected by the pulse width determining circuit 93.

Referring again to FIG. 5, the output of AND gates 142, 144 and 146 are fed to an OR gate 152 and a NAND gate 154, as shown. The output of NAND gate 154 will be logical 1 or high unless logical 1 signals are produced by AND gates 142, 144 and 146. This will occur only if all three AND gates 142, 144 and 146 indicate that pulses are being produced by all three detectors 32, 34 and 36 which have time durations less than this maximum time duration expected of a tank target. If that occurs an indication is provided that, while the object being detected has a "proper" width to be a tank target, it is excessively long and hence is not from a tank target but rather is from clutter extended in length. In response to such condition the logical 1 signals produced simultaneously (or nearly simultaneously by using pulse stretching networks between AND gates 142, 144, 146 and NAND gate 154) by AND gates 142, 144 and 146 cause NAND gate 154 to produce a low or logical 0 signal which inhibits a logical 1 signal produced by OR gate 152 from passing through AND gate 156. In the absence of such condition, if only one (or two) of the detectors 32, 34, 36 produces a pulse of proper width, indicating a tank target, a logical 1 signal produced by one (or two) of the AND gates 142, 144, 146 passes through AND gate 156 (if such AND gate is enabled by a signal produced by altimeter section 157) carried on the missile 8 to indicate that the missile 8 has passed through the maximum altitude in the predetermined range of altitudes in its downward trajectory) and activates a one shot multivibrator 158. In response to the leading edge of the pulse passing through AND gate 156 one shot multivibrator 158 produces a pulse having a time duration equal to one scan cycle of the scanning system 11 (FIG. 1), such pulse activating or enabling the gated amplifiers 66, 68, 70 to enable signals from AND gates 142, 144, 146 to pass to the guidance system 16 (FIG. 1). That is, each pulse produced by one-shot multivibrator 158 places the guidance system 16 in the track mode for one scan cycle to maintain the boresight of the scanning system 11 directed toward the detected (or acquired) tank and to provide guidance signals to maneuver the missile 8 to cause it to intercept the tank, as described above.

Referring now to the threshold generating circuit 112 (FIG. 5), it is again noted that such circuit 112 produces the threshold voltage $V_T$ on line 114 to enable the pulse width determining circuits 91, 93, 95 to reject pulses from objects which produce infrared energy having intensity less than that expected of a tank target. The circuit 112 is fed by the output of band pass filter 82 (which is coupled to the middle, or center, one of the detectors 32, 34, 36). Such threshold generating circuit 112 includes a pair of comparators 160, 162 fed by the output of bandpass filter 82, as shown. Also fed to such comparators 160, 162 is a threshold voltage $V'_T$, such threshold voltage $V'_T$ being fed to comparator 160 indirectly through amplifier 164, here having a gain of minus one-half to provide a voltage of $-V'_T/2$ for comparator 160. The output of comparator 160 is fed to a one-shot multivibrator 166 and to an AND gate 168 as shown. The output of comparator 162 is fed to a one-shot multivibrator 170. The outputs of one-shot multivibrators 166 and 170, together with the output of NAND gate 154, are fed to AND gate 168, as shown. It is noted that the arrangement of the comparators 160, 162, the one shot multivibrators 166, 170 and the AND gate 168 is similar to that of comparator 104, 106, one shot multivibrators 134, 136, and the AND gate 144 except for that the threshold voltage $V'_T$ for comparators 160, 162 is different from the threshold voltage $V_T$ for comparators 104, 106 and the AND gate 168 includes a fourth input (here from NAND gate 154). One shot multivibrators 166, 170 produce pulses of time durations slightly longer than (L/A) (1/R$_2$) (1/W) and (1/2) (L/A) (1/R$_2$) (1/W), respectively, which time durations are the same as those produced by one-shot multivibrators 134 and 136, such time durations being slightly longer than the maximum time duration expected for a detected tank target and one-half such maximum time duration, respectively. It follows then that if logical 1 signals are produced simultaneously by one shot multivibrators 166, 170 and comparator 160 a pulse is produced by detector 34 which is less than the maximum detector produced pulse expected from a tank target. Here, however, if the output of NAND gate 154 is low, indicating that the detected pulse is not from a tank but rather from clutter having extended length, as described above, the output of AND gate 168 remains low. It follows then that the pulse produced by AND gate 168 indicates detection of a potential tank target since a pulse of "proper width and length" is detected. The pulses produced at the output of AND gate 168 are fed to an integrator 172, as shown. Also, fed to such integrator 172 (i.e. to the negative input thereof, as shown) is a preselected reference voltage V$_S$, representative of a preselected constant false alarm rate; that is V$_S$ represents the number of potential tank targets desired to be detected per scan, here N potential tank targets per scan. To put it another way, the center detector 34 scans the ground and each time a pulse of "proper" width and length (i.e. proper size) is produced from ground clutter objects on the ground (and from tank objects in its field of view) a pulse is produced at the output of AND gate 168. The voltage V$_S$ is selected so that a preselected number, N, of "proper" pulses (i.e. potential tank targets) is produced each scan cycle. The preselected number, N, of proper pulses is greater than one. Assuming first that there are no tank targets in the area scanned by detector 34, the level of the voltage V'$_T$ will adjust so that N "proper" sized pulses are produced each scan cycle; that is, since here in this example there are no tank targets in the area scanned, N false targets are produced each scan cycle; N objects on the ground having the proper size to be from a tank target are detected per scan. If less than N such detections are produced the voltage V'$_T$ reduces in level; if more than N are produced the level V'$_T$ increases. It follows then that comparators 160, 162, one shots 166, 170, AND gate 168 and integrator 172 arranged as shown provide a constant false alarm rate circuit, integrator 172 producing a voltage level V'$_T$ representative of the infrared intensity of a preselected number of ground clutter produced signals, here N per scan, having proper widths and lengths to be from tank targets, such level V'$_T$ being shown by line 174 in FIG. 11.

The output of integrator 172 is fed to an amplifier 174. Also fed to amplifier 174 is a bias voltage V$_B$. The bias voltage V$_B$ represents the difference in intensity of tank targets and clutter and is provided to increase the level of the voltage produced by an integrator 172 by a fixed bias voltage V$_B$ volts so that the threshold level voltage V$_T$ fed to comparator 100, 102, 104, 106, 108 and 110 via line 114 is raised to account for the fact that tank objects radiate a greater amount of infrared energy than that radiated from natural objects, i.e. clutter. That is, referring to FIG. 11 the typical output for a detector is shown. The output of integrator 172 produces a voltage level of V'$_T$ such that here N potential tank targets (only pulses 173$a$, 173$b$, 173$c$, 173$d$ being shown) are detected per scan, such detection here being indicated by the fact that the detected pulse had a proper size (i.e. proper width and length, not clutter having extended length). An additional criteria which is used to indicate a "true" tank target is based on the observation that tanks will produce a stronger detected pulse than clutter. Thus, from the signal shown in FIG. 11 the larger amplitude pulses, here pulse 176, are more probably from a tank. Therefore, as noted above, the voltage V'$_T$ has a level representative of the intensity of a preselected number of ground clutter returns having proper widths and lengths being detected per scan. Such level V'$_T$ is increased by a fixed bias voltage level V$_B$ representative of the difference in intensity between tank target produced infrared energy and ground clutter produced infrared energy. The biased voltage represented by line 178 in FIG. 11 is the threshold voltage V$_T$. The threshold voltage V$_T$ fed to comparators 100, 102, 104, 106, 108 and 110 allows pulses having proper widths and proper intensity, or strength, to pass through the comparators and hence, through a selected one or ones of the pulse width determining circuits 91, 93, 95. Therefore, here only pulse 176 (FIG. 11) is passed through pulse width determining circuit 93. That is, the threshold voltage generator circuit 112 produces a threshold voltage for pulse width detection circuits 91, 93, 95 which automatically varies in accordance with a preselected number of detector produced pulses which are from potential tank targets based on the width, the lengths and the intensity of the energy produced by objects on the ground. It follows then that the processor 14 (FIG. 5) enables signals from detectors 32 to 36 to pass to the guidance system in the track mode if the detector produced pulse meets proper time duration (i.e. object size) and amplitude, i.e. object produced infrared energy intensity conditions.

It is noted that if there are one or two tank targets in the area scanned by detector 34 and if N is much greater than one the level of the voltage V'$_T$ will change insignificantly, hence will not significantly affect the level of such voltage.

Having described a preferred embodiment of the invention, it will now be apparent to one of skill in the art that other embodiments incorporating its concept may be used. It is felt therefore that this invention should not be restricted to the disclosed embodiment but rather should be limited only by the spirit and scope of the appended claims.

What is claimed is:

1. An airborne infrared energy detection system adapted to periodically scan an area of the ground having objects producing infrared energy and to discriminate between infrared energy produced by ground target objects and ground clutter objects in the periodically scanned area, such detection system comprising:
   (a) a plurality of detector means, each one thereof being adapted to produce electrical pulses in response to scanned infrared energy produced by the ground objects, the time durations of such pulses being related to the widths of the ground objects producing the scanned infrared energy;
   (b) a plurality of pulse width determining means, each one being coupled to a corresponding one of the plurality of detector means and having comparator means, fed by the electrical pulses produced by the corresponding one of the detector means coupled thereto and a threshold signal, for producing a pulse width detector signal indicating that the level of each one of the electrical pulses fed thereto exceeds the threshold signal and has a predetermined time duration less than a predetermined time duration selected in accordance with the maximum width expected of a ground target object;
   (c) means responsive to the plurality of pulse width detection signals for producing an extended length signal in response to pulse width detection signals produced by the plurality of pulse width determining means; and (d) threshold signal generating means including: constant false alarm rate means responsive to the electrical pulses produced by one of the detector means and the extended length signal for producing an intermediate voltage having a level representative of the level of the infrared energy produced by a preselected number of ground objects having proper widths and lengths to be potential ground target objects per scan cycle; and means coupled fed by the intermediate voltage for increasing the level of the intermediate voltage a predetermined amount representative of the difference in intensity between ground clutter objects and ground target objects to produce the threshold voltage.

2. The detection system recited in claim 1 wherein the constant false alarm rate means includes a pulse width determining means, fed by the electrical pulses produced by one of the detector means and the intermediate voltage, for producing a potential ground target pulse indicating that the level of each one of the electrical pulses fed thereto exceeds the intermediate voltage and has a predetermined time duration less than the predetermined time duration selected in accordance with the maximum width expected of a ground target object.

3. The detection system recited in claim 2 wherein the constant false alarm rate circuit includes an integrator fed by the potential ground target pulse for producing the intermediate voltage.

* * * * *